United States Patent
Hegyi (10) Patent No.: US 10,884,278 B2
(45) Date of Patent: Jan. 5, 2021

(54) LIQUID CRYSTAL TEMPERATURE CONTROL BY RESISTIVE HEATING

(71) Applicant: Palo Alto Research Center Incorporated, Palo Alto, CA (US)

(72) Inventor: Alex Hegyi, San Francisco, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 158 days.

(21) Appl. No.: 15/792,465

(22) Filed: Oct. 24, 2017

(65) Prior Publication Data

US 2019/0121191 A1 Apr. 25, 2019

(51) Int. Cl.
*G02F 1/133* (2006.01)
*G02F 1/1333* (2006.01)
(Continued)

(52) U.S. Cl.
CPC ...... *G02F 1/133382* (2013.01); *G01J 3/2823* (2013.01); *G02F 1/137* (2013.01); *G02F 1/13306* (2013.01); *G02F 1/13439* (2013.01); *G02F 1/133528* (2013.01); *G02F 1/134309* (2013.01); *G01J 2003/2826* (2013.01); *G02F 1/13471* (2013.01); *G02F 2001/133565* (2013.01); *G02F 2201/58* (2013.01);
(Continued)

(58) Field of Classification Search
CPC ........... G02F 1/133382; G02F 1/13439; G02F 1/133528; G02F 1/137; G02F 1/13306; G02F 1/134309; G02F 1/13471; G02F 2001/133565; G02F 2201/58; G02F 2203/05; G02F 2203/07; G02F 2203/60; G02F 1/1343; G01J 2003/2826; G01J 3/2823
See application file for complete search history.

(56) References Cited

U.S. PATENT DOCUMENTS 4,773,735 A 9/1988 Ukrainsky et al.
4,987,289 A 1/1991 Bishop et al.
(Continued)

FOREIGN PATENT DOCUMENTS

JP 10123527 A * 5/1998
WO 2008017316 2/2008
WO WO-2008017316 A1 * 2/2008 ............. G02B 27/01

OTHER PUBLICATIONS

Hegyi et al., "Hyperspectral imaging with a liquid crystal polarization interferometer", Optics Express, vol. 23, No. 22, Oct. 26, 2015, 13 pages.
(Continued)

*Primary Examiner* — Richard H Kim
(74) *Attorney, Agent, or Firm* — Mueting Raasch Group (57) ABSTRACT

An optical device includes a first transparent substrate having a first transparent electrode disposed on a surface of the first transparent substrate and a second substrate having a second electrode disposed on a surface of the second substrate and facing the first transparent electrode. A liquid-crystal (LC) material is sandwiched between the first and second electrodes such that a voltage applied between the first and second electrodes controls orientation of the liquid-crystal material. The device includes a control system that applies a current through at least one electrode of the first and second electrodes to resistively heat the LC material.

20 Claims, 9 Drawing Sheets

(51) Int. Cl.
*G02F 1/1343* (2006.01)
*G02F 1/1335* (2006.01)
*G02F 1/137* (2006.01)
*G01J 3/28* (2006.01)
*G02F 1/1347* (2006.01)

(52) U.S. Cl.
CPC ...... *G02F 2203/05* (2013.01); *G02F 2203/07* (2013.01); *G02F 2203/60* (2013.01)

(56) References Cited

U.S. PATENT DOCUMENTS

| | | | |
|---|---|---|---|
| 6,089,751 A * | 7/2000 | Conover | G02F 1/133382 219/209 |
| 6,888,582 B2 * | 5/2005 | Tominaga | G02F 1/133382 348/E5.141 |
| 8,368,866 B2 | 2/2013 | Lee et al. | |
| 2004/0164946 A1 * | 8/2004 | Cavanaugh | G02F 1/133382 345/101 |
| 2005/0041020 A1 * | 2/2005 | Roes | G02F 1/1334 345/211 |
| 2014/0254620 A1 * | 9/2014 | Bessette | H01L 21/02664 372/45.01 |
| 2018/0095307 A1 * | 4/2018 | Herloski | G03G 15/5041 |

OTHER PUBLICATIONS

EP Search Report for EP App. No. 18202137.8 dated Mar. 6, 2019, 11 pages.

\* cited by examiner

LIQUID CRYSTAL TEMPERATURE CONTROL BY RESISTIVE HEATING

BACKGROUND

Liquid-crystal materials are liquids having some crystalline properties. These materials change orientation in an electric field. The change in orientation alters the optical properties of the liquid-crystal materials.

SUMMARY

Some embodiments are directed to an optical device. The optical device includes a first transparent substrate having a first transparent electrode disposed on a surface of the first transparent substrate and a second substrate having a second electrode disposed on a surface of the second substrate and facing the first transparent electrode. A liquid-crystal material is sandwiched between the first and second electrodes such that a voltage applied across the first and second electrodes controls orientation of the liquid-crystal material. A control system applies a current through at least one electrode of the first and second electrodes to resistively heat the liquid-crystal material. In some implementations, the second substrate and the second electrode can also be transparent.

According to some aspects, one or more electrical contacts having higher conductivity than the at least one electrode may be disposed on the at least one electrode. For example, first and second spaced apart electrical contacts can be disposed on the at least one electrode wherein the at least one electrode is electrically connected to the control system through the first and second spaced apart electrical contacts. The first and second electrical contacts can comprise a patterned metallic layer, e.g., a conductive paint, according to some implementations. According to some implementations, one or both of the first and second electrodes comprise a conductive oxide, such as indium tin oxide.

The electrical current used for resistive heating may be a pulsed current. According to some aspects, the duration of the current pulses is a function of thermal time constants of the liquid-crystal material and the first or second substrate. The current pulses can have a duty cycle of less than about 10% or less than about 5% or even less than about 1%. According to some embodiments, the thermal energy supplied and the time over which the thermal energy is supplied to the at least one electrode by the controller takes into account a model of the thermal diffusivity and/or specific heat of the LC materials.

In some implementations it can be useful to thermally decouple the at least one electrode and the substrate upon which the at least one electrode is disposed from surrounding structures. For example, one or more thermally insulative standoffs may be arranged to thermally decouple the at least one electrode and its associated substrate from the surrounding structures.

The control system controls the heat provided by one or both electrodes by controlling the current through the electrode(s). According so some aspects, only one of the electrodes is energized to resistively heat the device. However, both of the electrodes could be energized to provide resistive heating. In some implementations, the control system can comprise a source electrically coupled to first and second spaced apart locations of the at least one electrode wherein the source provides current through the at least one electrode, the current flowing from the first location to the second location. The control system may further include a switch configured to control the current through the at least one electrode.

According to some aspects, the control system can also be configured to control the voltage applied across the first and second electrodes to control the orientation of the liquid-crystal material. For example, the control system can include liquid-crystal (LC) orientation control circuitry configured to control the voltage applied across the first electrode and the second electrode to control orientation of the liquid-crystal material and heating control circuitry configured to control current through the at least one electrode to resistively heat the liquid-crystal material.

In some implementations, the control system may be configured to time multiplex the voltage applied across the first electrode and the second electrode to control orientation of the liquid-crystals and the electrical signal applied to the at least one electrode to resistively heat the electrode. The time multiplexing can be accomplished by applying the voltage that controls the orientation of the LC material during first time windows and providing the current that resistively heats the at least one electrode during different second time windows.

In some configurations, the control system includes a first current source electrically connected to the first electrode and configured to apply a first current through first and second spaced apart locations of the first electrode to resistively heat the first electrode. The control system also includes a second current source, independent from the first current source, the second current source connected to the second electrode and configured to apply a second current through first and second spaced apart locations of the second electrode to resistively heat the second electrode. The resistance between the first and second spaced apart locations of the first electrode may be substantially equal to or may be different from the resistance between the first and second spaced apart locations of the second electrode. According to some aspects, the first and second currents can be applied at different times. According to some aspects, the first and second currents can be applied substantially simultaneously. The first current and the second current may have the same value or the first current and the second current may have different values. The control system may include a switch controlled by heater control circuitry of the control system. The switch can allow or prevent the first and second currents to flow through the first and second electrodes, respectively.

According to some aspects, the control system further includes a temperature sensor configured to generate a temperature signal in response to a sensed parameter indicative of temperature of the liquid-crystal material. The control system includes circuitry that controls the current through the at least one electrode in response to the temperature signal. For example, the electrode material may have a temperature coefficient of resistance such that the resistance of the electrode material changes with temperature. In this scenario, the sensed parameter can be the resistance of the at least one electrode and the sensor comprises a four point resistance measurement wherein current is supplied through the first and second spaced apart locations of the at least one electrode and voltage is measured across two spaced apart locations of the at least one electrode with a pair of voltage probes.

According to some implementations, the optical device described above can be configured as an LC variable retarder. An LC variable retarder functions by application of a voltage across the electrodes with the LC material sandwiched between the electrodes. As the voltage across the electrodes changes the orientation of the LC material is altered. The alteration of the LC material orientation changes the slow axis of the birefringent LC material and thus the relative retardation of two independent polarizations of an input light beam.

According to some implementations, the optical device described above can be used to make an LC tunable filter. For example, an LC tunable filter can be formed wherein one or multiple LC devices as described above are employed as tunable birefringent elements that transmit a selected wavelength by adjusting the voltage applied across the electrodes of the LC material. For example, an LC tunable filter may be based on the principals of the Lyot filter.

Some embodiments are directed to a hyperspectral imaging system. The hyperspectral imaging system includes first and second crossed or parallel polarizers with a liquid-crystal (LC) variable retarder disposed between the first polarizer and the second polarizer, with slow axis oriented 45 degrees with respect to one of the polarizer axes. The LC variable retarder includes a first transparent substrate with a first transparent electrode disposed on a surface of the first transparent substrate. The LC variable retarder includes a second transparent substrate with a second transparent electrode disposed on a surface of the second transparent substrate facing the first transparent electrode. An LC material is disposed between the first electrode and the second electrode. The first and second electrodes are arranged such that a voltage applied across the first electrode and the second electrode controls orientation of the liquid-crystal material and an electrical current through at least one electrode of the first and second electrodes resistively heats the liquid-crystal material. The hyperspectral imaging system can also include a control system electrically coupled to the first electrode and the second electrode, the control system configured to provide the voltage to control the orientation of the LC material and to provide current through the at least one electrode to heat the LC material.

Some embodiments are directed to a method of controlling a liquid-crystal device comprising a first electrode, a second electrode, and LC material disposed between the first electrode and the second electrode. According to the method, the orientation of the LC material is controlled by a voltage applied across the first electrode and the second electrode. The temperature of the LC material is controlled by supplying a current through at least one electrode of the first and second electrodes. The current may be a pulsed current, e.g., pulsed only before and/or during hyperspectral image acquisition. Supplying the current involves supplying the current through spaced apart locations of the at least one electrode. The current can be supplied and/or controlled by applying a voltage across first and second spaced apart locations of the at least one electrode.

According to some aspects, supplying the current may involve supplying current through only one of the first and second electrodes. Alternatively, supplying the current may involve controlling a first current through the first electrode and/or controlling a second current through a second electrode. Controlling the first and/or second current can involve operating one or more switches that allow current to flow or interrupt current flow through the first and/or second electrodes.

According to some implementations controlling the first current and the second current comprises providing the first current and the second currents substantially simultaneously through the first and second electrodes.

According to some implementations, controlling the orientation of the LC material and resistively heating the LC material comprises time multiplexing the voltage that controls orientation of the LC material with the current that resistively heats the LC material.

The method may further involve sensing temperature of the LC material or the temperature of the at least one electrode and controlling the resistive heating in response to the sensed temperature.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DESCRIPTION

Temperature is a parameter that strongly affects performance of liquid-crystal (LC) devices. There is a range of temperatures for which LC material is in a nematic state. Many LC devices require that the LC device is operated within the nematic temperature range. Some LC devices require that the LC device is stored within the nematic temperature range. Furthermore, there is an optimal temperature, captured by a liquid-crystal Figure of Merit (FoM), where a fixed amount of optical path delay can be switched in the shortest time (with cell thickness as a dependent parameter). Therefore, many LC devices require temperature control for proper or optimal operation.

Embodiments discussed herein are directed to temperature control of LC devices through resistive heating. Liquid-crystal devices generally include some sort of transparent electrode, for example a transparent conductive oxide or a thin metallic layer. A standard antiparallel nematic LC cell can resemble a parallel plate capacitor with LC material disposed between the electrodes. The electrodes are driven to different voltages to control the orientation of the LC material, and all areas of a given electrode are otherwise assumed to be at the same potential. The approaches discussed herein involve the use of one or more of the electrodes as a Joule heater for the LC material by passing current through the electrode, taking into account various driving configurations and time sequences. In these configurations, the potential at different points of the same electrode can be different.

By using the LC cell electrode as the LC heater and/or LC temperature sensor, lower power consumption and/or faster and more precise temperature control can be achieved than if the LC heater and/or LC temperature sensor were located external to the LC cell. Furthermore, utilizing the LC cell electrode for heating and temperature sensing in addition to driving the LC cell helps to simplify the manufacturing processes required to form the liquid-crystal devices. Embodiments described below involve using LC cell orientation control electrodes for multiple purposes such as temperature sensors and resistive heaters for liquid-crystal materials to control the liquid-crystal material temperature and/or decrease the orientation switching time.

Figure 1:
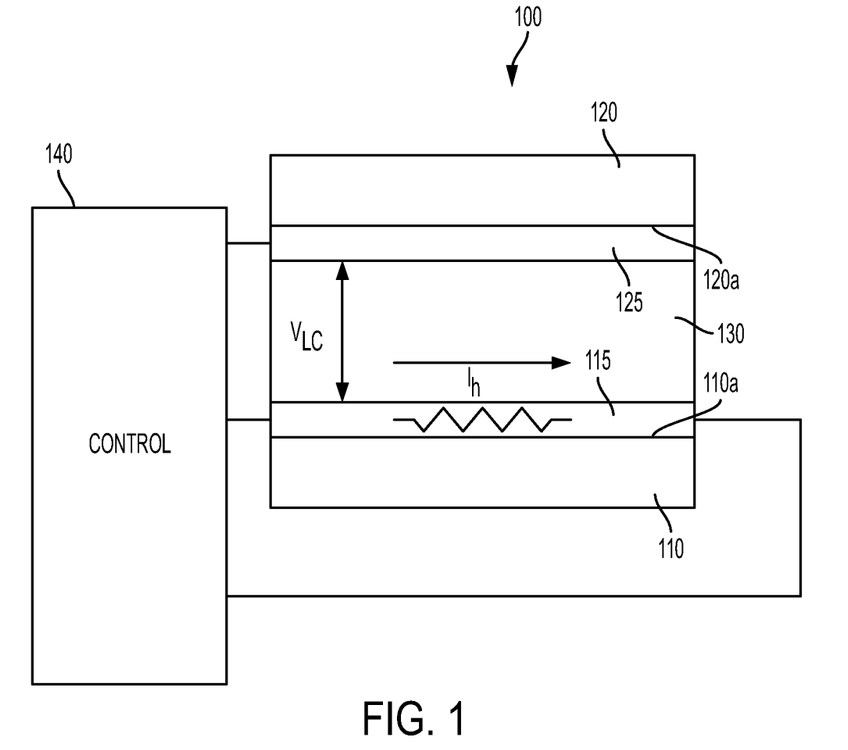
FIG. 1 is a schematic diagram of a liquid-crystal device in accordance with some embodiments.

FIG. 1 is a schematic diagram of a liquid-crystal device 100 in accordance with some embodiments. The device 100 includes a first substrate 110 with a first electrode 115 disposed on a surface 110a of the first substrate 110 and a second substrate 120 with a second electrode 125 disposed on a surface 120a of the second substrate 120 facing the first electrode 125. One or both of the substrates 110, 120 may be made of a transparent material, such as glass. One or both of the electrodes 115, 125 may be made of a transparent conductor such as a conductive oxide, e.g., indium tin oxide (ITO) or a thin metal layer.

A liquid-crystal material 130 is disposed between the first electrode 115 and the second electrode 125. The first and second electrodes 115, 125 are arranged such that a voltage applied across the first and second electrodes 115, 125 controls the orientation of the liquid-crystal material 130. Changing the voltage across the first and second electrodes 115, 125 changes the optical characteristics of the LC material, such as the optical retardance between two orthogonal polarizations of a light beam normally incident to one of the substrates 110, 120.

The resistance of an electrode dissipates power in the form of heat when current passes through the electrode. The resistive heat generated by the current through the electrode heats the liquid-crystal material. In embodiments disclosed herein at least one of the electrodes 115, 125 used to control the orientation of the liquid-crystal material 130 is also used to resistively heat the liquid-crystal material 130. The at least one electrode is disposed within the interior of the cell adjacent to the LC material.

As depicted in FIG. 1, the device 100 includes a control system 140 configured to supply the heater current, $I_h$, through the electrode 115. The control system 140 may also be configured to supply the orientation control voltage, $V_{LC}$, across the first 115 and second 125 electrodes. According to some embodiments, the control circuitry 140 includes electronic circuitry, such as switches, sensors, and/or control circuitry and/or processors configured to implement automatic open loop control and/or closed loop feedback control for the heater current.

Figure 2:
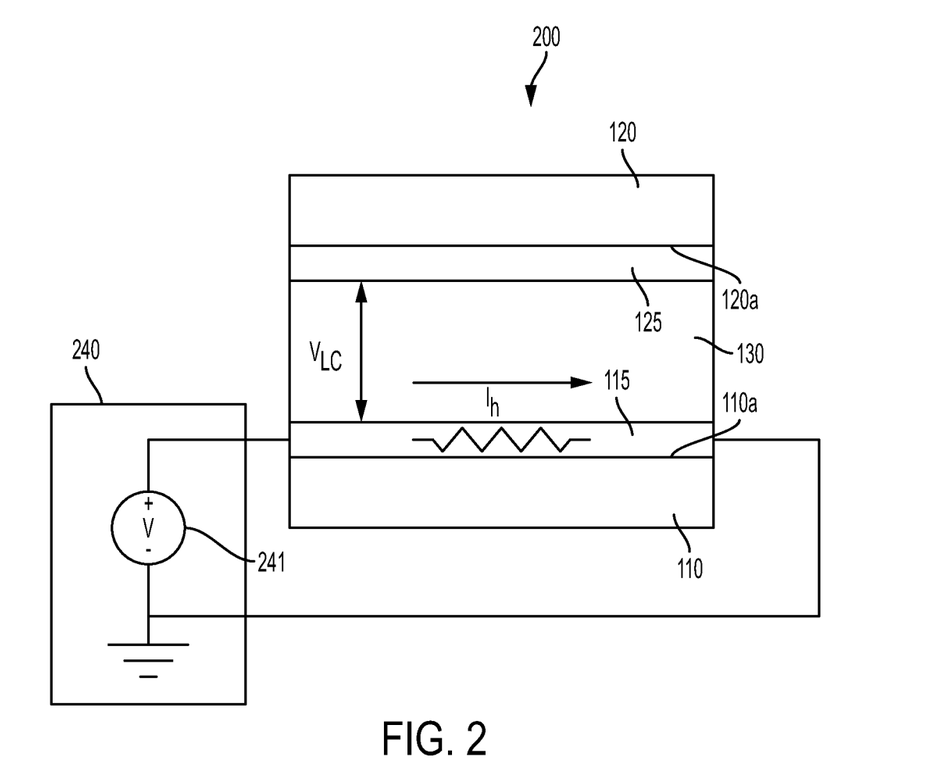
FIG. 2 is a diagram of a liquid-crystal device with a control system that comprises a voltage source configured to provide a heater current, $I_h$, through a first electrode.

In the LC device 200 depicted in the block diagram of FIG. 2, control system 240 comprises a voltage source 241 that provides a heater current, $I_h$, through the first electrode 115 which serves as the heater electrode in this embodiment. An orientation control voltage, $V_{LC}$, can be applied across the first and second electrodes 115, 125 to control the orientation of the LC material 130.

The LC device 200 of FIG. 2 includes an electrode 115 where a controlled bias can be applied to the electrode 115, such that a current flows through the electrode 115 with resistance R. For example, if the LC device 200 has an area of 1 cm² and a thermal diffusivity D of 1 mm²/s, and if the voltage source 241 applies a voltage V across the electrode 115, generating Joule heating $V^2/R$, for a time period of 1 s, (1 s)·$V^2/R$ Joules will be deposited in an approximately 0.5 g quantity of glass and the incidental amount of LC material 130, raising the temperature of the LC material 130 about 2.5° C. per Joule (J). To achieve a 10° C. temperature rise would therefore require 4 J. If the first electrode 115 is indium tin oxide (ITO) with a typical sheet resistance of 25 ohms per square, providing 4 J is possible by applying a voltage of 10 V (and current of 400 mA) for the 1 s time period. This scenario is within a reasonable range for a liquid-crystal cell heater circuit.

Figure 3:
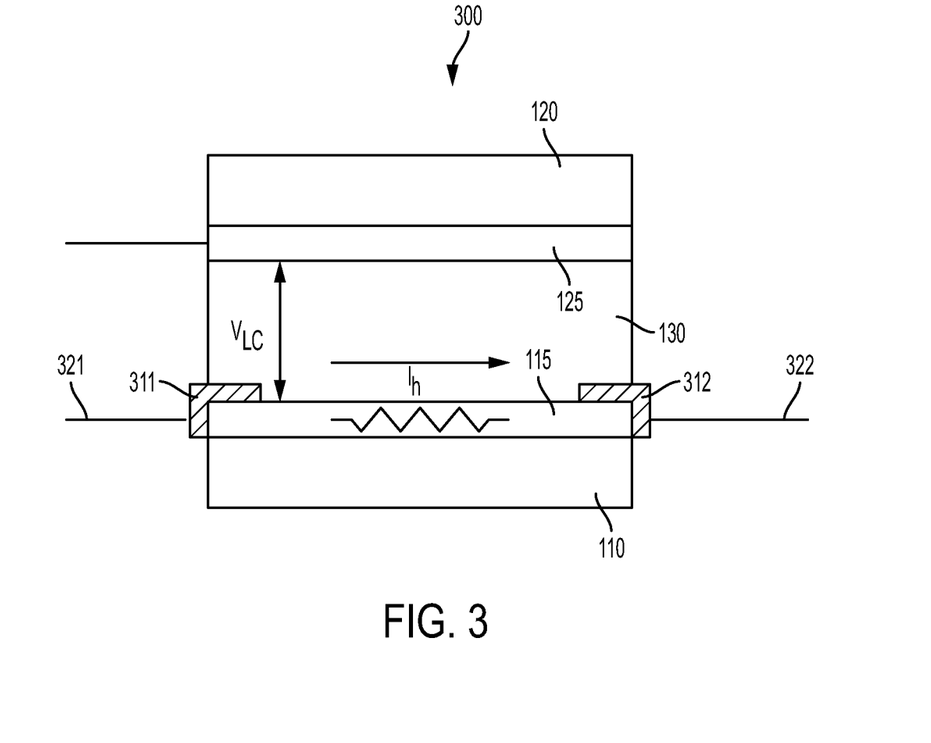
FIG. 3 illustrates a liquid-crystal device that includes electrical contacts disposed on one of the electrodes in accordance with some embodiments.

The distribution of the current through the electrode can be partially controlled by the location of electrical connections to either side of the electrode. To achieve a substantially uniform sheet of current flowing through the electrode, a highly conductive material, for example a thin metallic or gold layer deposited by evaporation, or a metallic paint or ink, can be deposited separately across both sides and/or edges of the electrode where the electrical connections to the source are made. As illustrated FIG. 3, in some configurations, an LC device 300 may comprise electrical contacts 311, 312 disposed on one or both of the first 115 and second 125 electrodes. Electrical contacts 311, 312 are formed of a material having higher conductivity than the material of the electrodes 115, 125 to facilitate a uniform sheet heater current density in one or both of the electrodes 115, 125. The contacts 311, 312 may be disposed at two or more spaced apart locations on one or both of the electrodes 115, 125. In some embodiments, the contacts 311, 312 may only be disposed on the electrode 115 that passes current used for heating the liquid-crystal material 130. The contacts 311, 312 may be or comprise a conductive paint or ink that is painted or printed on the electrodes 115, 125, or a patterned, evaporated metal film, for example.

Figure 4:
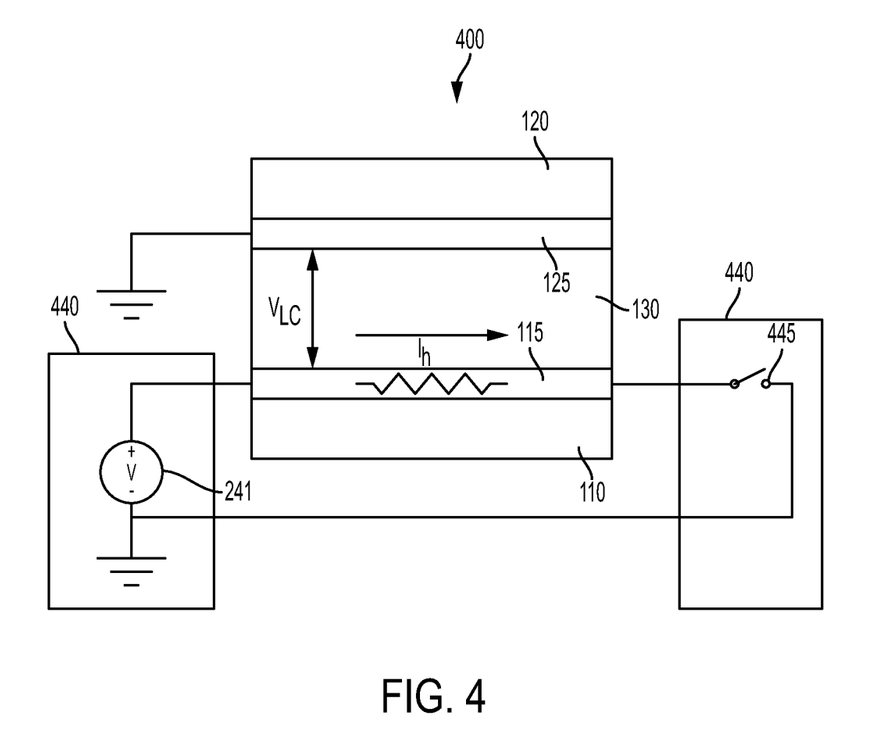
FIG. 4 is a schematic diagram illustrating a device having one grounded electrode and one electrode that provides Joule heating in accordance with some embodiments.

FIG. 4 is a schematic diagram illustrating a device 400 having one grounded electrode 125 and one electrode 115 that provides Joule heating in accordance with some embodiments. A voltage source 241 can be used to provide current through electrode 115 and/or to control the LC material orientation.

As depicted in the schematic diagram of FIG. 4, according to some embodiments, the control system 440 of the LC device 400 includes at least one switch 445 configured to control the heater current. Circuitry of the control system 440 can be configured to operate the switch 445 to a closed or open configuration to apply or remove the heater current, $I_h$, from the heater electrode 115. The control system 440 can operate switch 445 to time multiplex between a voltage that generates the heater current through electrode 115 and a voltage that controls the orientation of the LC material. The control system 440 applies the orientation control voltage when the switch 445 is open. In this configuration, there is a substantially uniform potential across the first electrode 115. When the switch 445 is closed, application of a voltage by voltage source 241 creates a current that passes through electrode 115 and therefore creates a potential gradient across the electrode 115.

In some implementations, the control system 440 operates the switch 445 to provide a pulsed heater current. It can be useful to limit the duration of the heater current pulses to reduce potential interference between application of the heater current and the orientation control voltage. To provide for optimal heating with reduced potential for interference, the duration of the current pulses can be selected based on thermal time constants of the electrode, liquid-crystal material, and the thermal time constants of the adjacent substrates or at least a portion of the adjacent substrates that is proximate to the heater electrode. In some embodiments, the duty cycle of the pulses is less than about 10%, or less than about 5%, or even less than about 1%. If the duty cycle or cycling time of using the LC device is relatively low (e.g., heat for 1 s every minute), then the LC device can be allowed to cool between usages.

Alternatively, if the duty cycle is higher, it may make sense to thermally isolate the LC device by mounting the LC device on thermally insulating standoffs that mechanically integrate it into a larger system. Thermally isolating the LC device can result in less heat loss to the surrounding structure. For example, the surrounding structure can include the housing, frame and/or other supporting members of the LC device.

Figure 5:
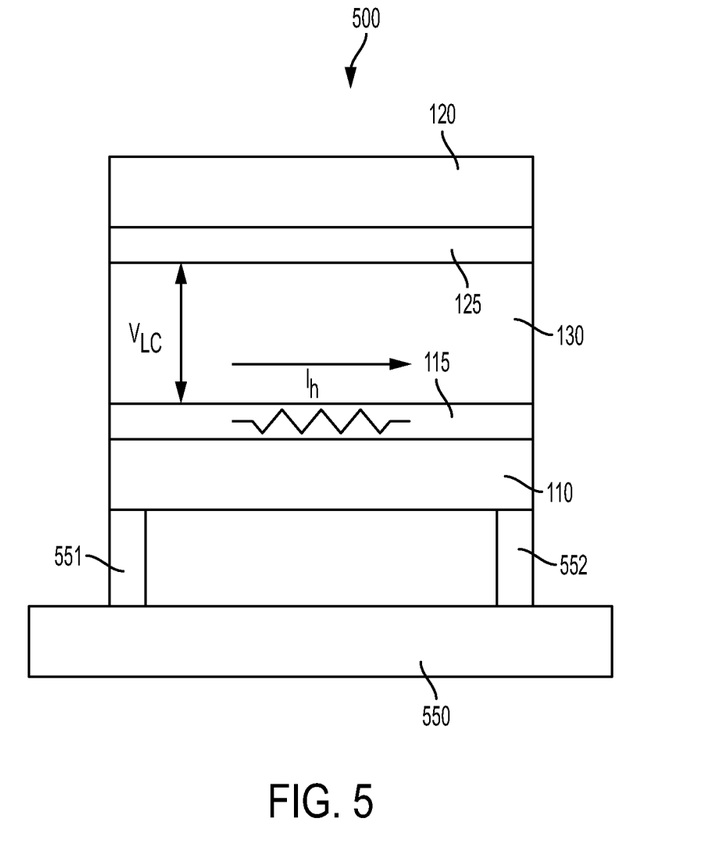
FIG. 5 illustrates an embodiment of a liquid-crystal device that provides for thermal decoupling of the substrate associated with the heater electrode in accordance with some embodiments.

FIG. 5 illustrates an embodiment of an LC device 500 that provides for thermal decoupling of the substrate associated with the heater electrode. Liquid-crystal device 500 includes standoffs 551, 552 made of a thermally insulating material. The standoffs 551, 552 are disposed between the substrate 110 associated with the electrode 115 that carries the heater current, $I_h$, and the surrounding structure 550 of the LC device 500. Note that the standoffs 551, 552 can be arranged such that they do not obscure the LC device's clear aperture.

Returning now to FIG. 4, the LC device 400 includes a control system 440 configured to control the heater current via switch 445 electrically coupled through the heater electrode 115 to voltage source 241. The control system 440 may apply a time-multiplexing protocol to mediate conflict between applying the orientation control voltage across the first and second electrodes 115, 125 and applying a voltage that generates current through electrode 115. The control system 440 applies an orientation control voltage at voltage source 241 when the switch 445 is open. When the switch 445 is closed, a voltage applied by voltage source 241 creates a current that passes through electrode 115. However, in this scenario, an undesirable voltage drop across heater electrode 115 may be present and problematic.

Figure 6:
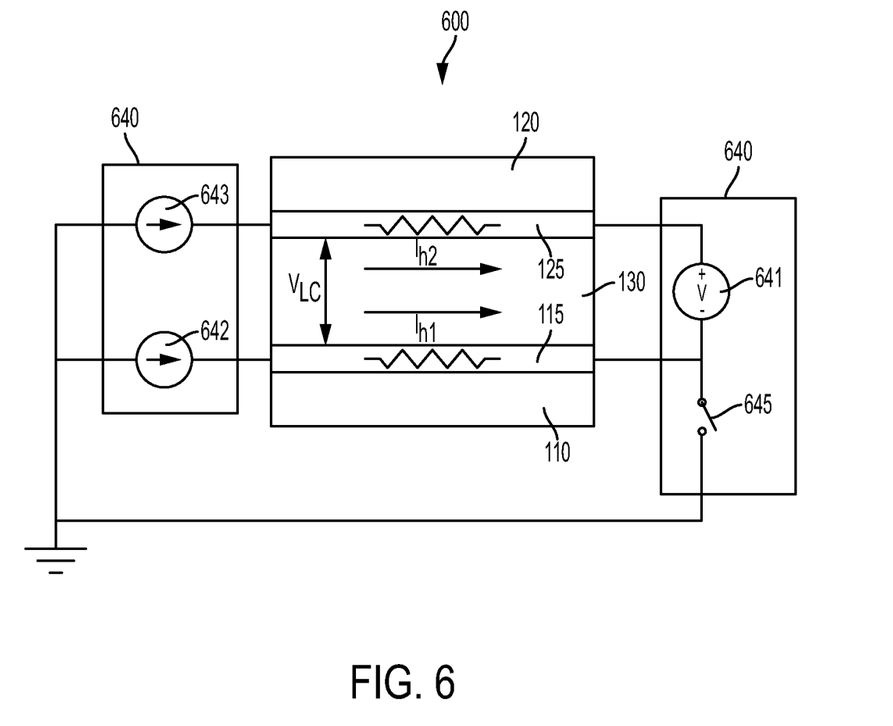
FIG. 6 shows a liquid-crystal device comprising a current source applied at one end of each electrode and a voltage source connected at the opposite end of each electrode in accordance with some embodiments.

A way to remedy the undesirable voltage drop is provided by the control system 640 of LC device 600 shown schematically in FIG. 6. The device of FIG. 6 includes a current source applied at one end of each electrode and a voltage source applied at the opposite end of each electrode. Control system 640 controls two current sources 642, 643. Each current source 642, 643 provide current I. Current source 642 is electrically connected to a first location, e.g., first edge, of the first electrode 115 and current source 643 is electrically connected to a first location, e.g., first edge, of the second electrode 125. Each of the first and second electrodes 115, 125 may have substantially the same edge to edge resistance R. Therefore, the voltage drop across each electrode 115, 125 from end to end is I*R. The voltage drop from the first electrode 115 to the second electrode 125 is controlled by the voltage source 641 providing voltage V. This voltage drop from the first electrode 115 to the second electrode 125 will be the same across any vertical line from the first electrode 115 to the second electrode 125. Thus, the electric field is substantially uniform within the liquid-crystal material 130, allowing its orientation to be controlled independently of the heating. A switch 645 may be used to control whether current is flowing through the electrodes 115, 125. Note that the configuration shown in FIG. 6 is but one of many circuit configurations that can provide for both heating and orientation control with minimal undesirable voltage drop across each electrode. These circuit configurations are considered to be encompassed within the approaches described herein.

Figure 7:
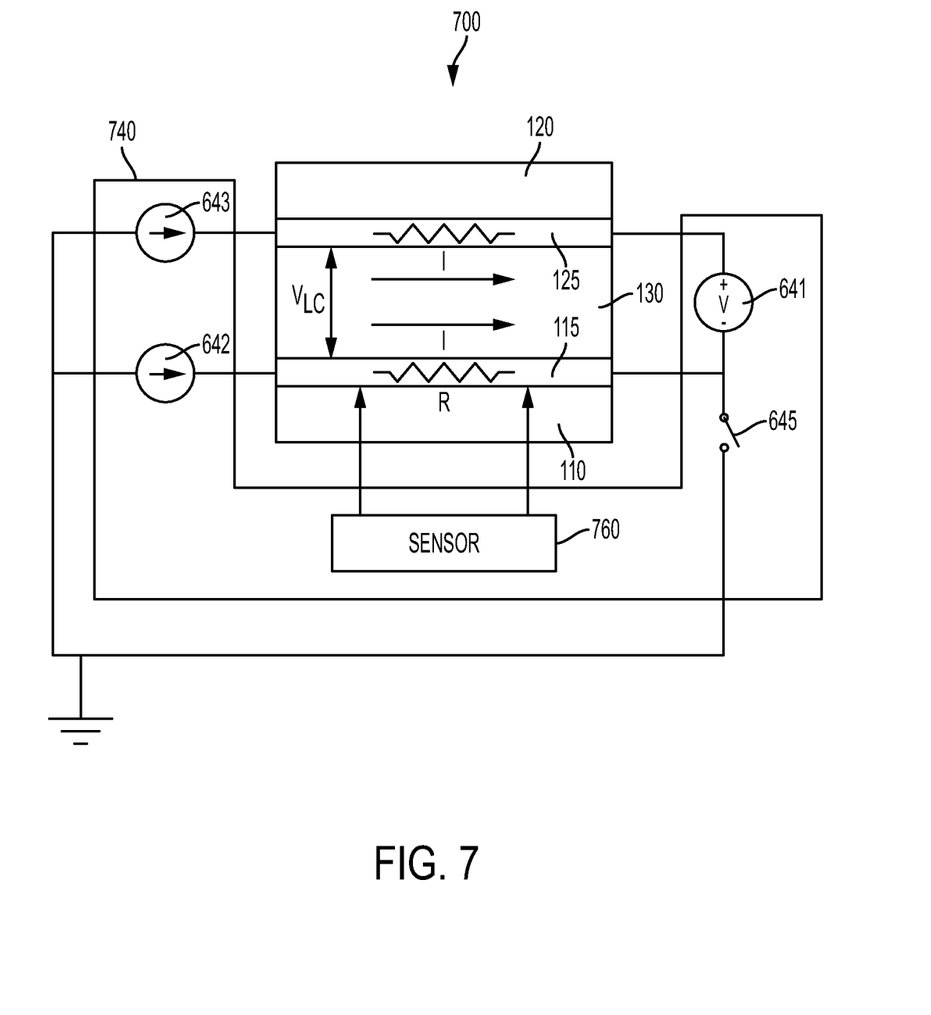
FIG. 7 illustrates a liquid-crystal device comprising a feedback control system that includes a sensor configured to measure the temperature of a component of the liquid-crystal device.

As depicted in the schematic diagram of FIG. 7, in some embodiments an LC device 700 comprises a feedback control system 740 that includes a sensor 760 configured to measure the temperature of the heating electrode, liquid-crystal material, or other LC device component. The temperature measurement can be used by the control system 740 to provide a feedback signal for controlling the current applied to heat the LC material.

In some embodiments, the temperature sensor may comprise a four point probe that measures the resistance of the electrode, the LC material, and/or other components of the LC device. Due to the known temperature coefficient of resistance of the measured material, the resistance measurement provides a surrogate measurement of temperature and can be used to control the heater current. FIG. 7 shows a four-point resistance measurement configuration of the resistance R of the first electrode 115, whereby the current is provided through electrode 115 by current source 642, and voltage is measured by the sensor 760. The four point resistance measurement provides an accurate readout of the resistance R and is thus a surrogate for a temperature measurement that can be used by the control system 740 to control the heater current, I, to achieve a desired temperature. This approach provides enhanced measurement accuracy compared to other methods, at least because the sensing element is close to the LC material.

Figure 8A:
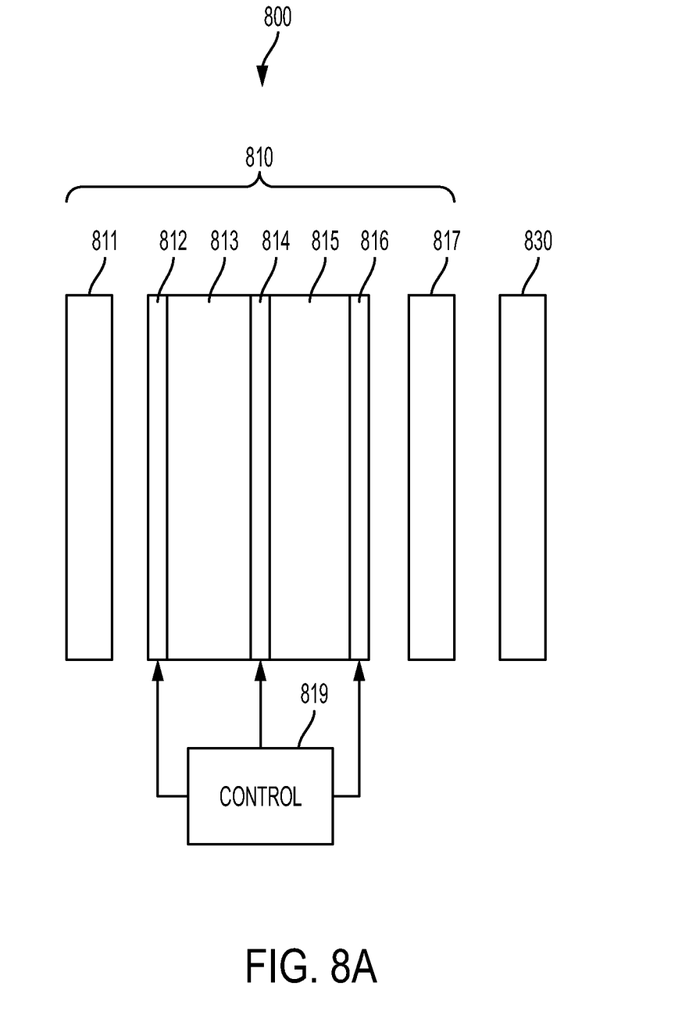
FIG. 8A is a block diagram illustrating a hyperspectral imaging system in accordance with some embodiments.
Figure 8B:
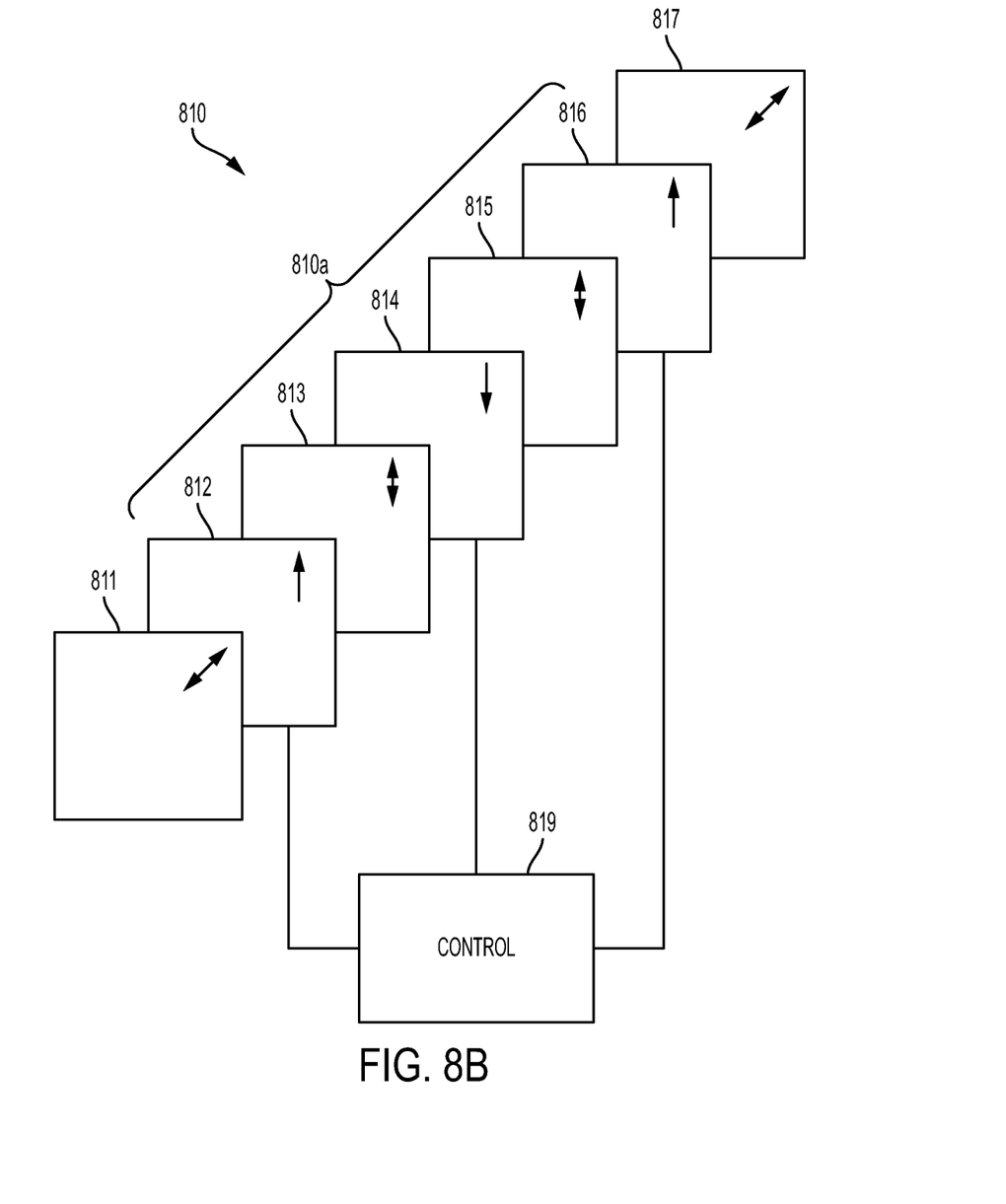
FIG. 8B depicts the liquid-crystal variable retarder of the hyperspectral imaging system of FIG. 8A in more detail.

The LC device as discussed herein is particularly useful as a variable optical retarder in a spectral encoder for a hyperspectral imaging system 800 as shown in the block diagram of FIG. 8A. The hyperspectral imager 800 of FIG. 8A is based on a liquid-crystal (LC) spectral encoder 810 that is temperature controlled using resistive heating as described herein in combination with an image sensor 830. The LC spectral encoder 810 shown in FIG. 8A and shown in more detail in FIG. 8B encodes the spectral information into an interferogram at each point in an image by interfering light that travels over a common path but with two orthogonal polarizations. A first polarizer 811 polarizes the incoming light in an incident polarization direction, nominally 45 degrees to the rubbing (alignment) direction of the LC cell 810a. The LC cell 810a shown in FIGS. 8A and 8B is a double nematic structure that includes first LC material 813 disposed between first 812 and second 814 electrodes and second LC material 815 disposed between second 814 and third 816 electrodes. In the double nematic structure, the first half of the LC cell 810a is mirrored with respect to the second half of the LC cell 810a wherein the first half includes first LC material 813 and the second half includes the second LC material 815. The thickness of the first LC material 813 and the second LC material 815 may be about equal in some embodiments. The double nematic arrangement causes the relative path delay of the extraordinary ray and the ordinary ray to increase as they travel through both halves of the LC cell 810a, but the first order angular dependence of the first half of the LC cell 810a is negated by the first order angular dependence of the second half of the LC cell 810a.

The LC cell's rubbing direction is indicated by an arrow on each electrode 812, 814, 816 in FIG. 8B and is the preferred direction along which the molecules of the LC material orient. Thus, light polarized in the direction or the arrows on the electrodes 812, 814, 816 (extraordinary ray or e-ray) will be retarded with respect to light polarized orthogonally (ordinary ray or o-ray). The LC cell 810a functions as an electrically tunable birefringent element. By varying the voltage across the LC cell 810a, the LC molecules change their orientation, and it is possible to create a variable optical path delay between the e-ray and the o-ray. This path delay causes a wavelength-dependent phase shift between the two rays, thereby leading to a wavelength-dependent change in the polarization state.

A second polarizer 817, or analyzer, oriented either parallel or perpendicular to the first polarizer, changes this wavelength-dependent polarization state into a wavelength-dependent intensity pattern by interfering the two rays. The intensity pattern (as a function of path delay) is equivalent to an interferogram generated by a Michelson interferometer. Thus, the intensity pattern corresponds to the cosine transform of the spectrum of the incident light. By recording a series of images as the voltage on the LC cell 810a is changed by the controller 819, the interferograms at all points in an image can be sampled simultaneously, and the hyperspectral data-cube can be recovered by inverse cosine transform along the optical path delay axis.

The controller 819 can vary the orientation of the first LC material 813 by varying the voltage applied across the electrodes 812 and 814 and can vary the orientation of the second LC material 816 by varying the voltage applied across electrode 814 and 816. The controller 819 can control the temperature of the LC material 815 through resistive heating by passing current through one or more of the electrodes 812, 814, 816 as previously described.

In the above detailed description, numeric values and ranges are provided for various aspects of the implementations described. These values and ranges are to be treated as examples only, and are not intended to limit the scope of the claims. For example, embodiments described in this disclosure can be practiced throughout the disclosed numerical ranges. In addition, a number of materials are identified as suitable for various implementations. These materials are to be treated as exemplary, and are not intended to limit the scope of the claims.

The foregoing description of various embodiments has been presented for the purposes of illustration and description and not limitation. The embodiments disclosed are not intended to be exhaustive or to limit the possible implementations to the embodiments disclosed. Many modifications and variations are possible in light of the above teaching.

The invention claimed is:

1. A device comprising:
a first transparent substrate;
a first transparent electrode disposed on a surface of the first transparent substrate;
a second substrate;
a second electrode disposed on a surface of the second substrate facing the first transparent electrode;
a liquid-crystal material disposed between the first and second electrodes such that a voltage applied between the first and second electrodes controls orientation of the liquid-crystal material; and
a control system configured to apply an electrical current through at least one electrode of the first and second electrodes to resistively heat the liquid-crystal material, characterized in that the electrical current is selected based on thermal time constants of the at least one electrode, the liquid-crystal material, and at least a portion of the first transparent substrate and the second substrate.

2. The device of claim 1, wherein the second substrate and the second electrode are transparent.

3. The device of claim 1, further comprising a first and second spaced apart electrical contacts disposed on the at least one electrode, the first and second electrical contacts having higher conductivity than the at least one electrode.

4. The device of claim 1, wherein one or both of the first and second electrodes comprise a conductive oxide.

5. The device of claim 1, wherein the electrical current is a pulsed current.

6. The device of claim 5, wherein the current pulses have a duty cycle of less than about 10%.

7. The device of claim 1, wherein the at least one electrode and the substrate upon which the at least one electrode is disposed are thermally decoupled from surrounding structures.

8. The device of claim 1, further comprising one or more thermally insulative standoffs arranged to thermally decouple the at least one electrode and the substrate upon which the at least one electrode is disposed from the surrounding structures.

9. The device of claim 1, further comprising first and second spaced apart contacts disposed on the at least one electrode, the first and second contacts having higher conductivity than the at least one electrode, the first and second contacts electrically coupled to the control system.

10. The device of claim 1, wherein the control system includes liquid-crystal (LC) orientation control circuitry configured to control the voltage applied between the first electrode and the second electrode to control orientation of the liquid-crystal material and heating control circuitry configured to control current through the at least one electrode to resistively heat the liquid-crystal material.

11. The device of claim 10, wherein the control system is configured to time multiplex the voltage applied between the first electrode and the second electrode to control orientation of the liquid-crystal material and the electrical current applied through the at least one electrode to resistively heat the electrode.

12. The device of claim 1, wherein the control system comprises:
a first current source electrically connected to the first electrode and configured to apply a first current through first and second spaced apart locations of the first electrode to resistively heat the first electrode; and
a second current source, independent from the first current source, the second current source connected to the second electrode and configured to apply a second current through first and second spaced apart locations of the second electrode to resistively heat the second electrode.

13. The device of claim 12, wherein the control system includes a switch controlled by heater control circuitry of the control system, the switch arranged to allow or prevent the first and second currents to flow through the first and second electrodes, respectively.

14. The device of claim 1, wherein the control system comprises:
a temperature sensor configured to generate a temperature signal in response to a sensed parameter indicative of temperature of the liquid-crystal material; and
control circuitry configured to control the current in response to the temperature signal.

15. The device of claim 14, wherein the sensed parameter is resistance of the at least one electrode.

16. A hyperspectral imaging system comprising:
a first polarizer;

a second polarizer;

a liquid-crystal variable retarder disposed between the first polarizer and the second polarizer, the liquid-crystal retarder comprising:

a first transparent substrate;

a first transparent electrode disposed on a surface of the first transparent substrate;

a second transparent electrode;

a second transparent electrode disposed on a surface of the second transparent substrate facing the first transparent electrode; and liquid-crystal material disposed between the first electrode and the second electrode, the first and second electrodes arranged such that a voltage applied between the first electrode and the second electrode controls orientation of the liquid-crystal material and an electrical current applied through at least one electrode of the first and second electrodes resistively heats the liquid-crystal material; and an image sensor arranged to receive light from the second polarizer, characterized in that the electrical current is selected based on thermal time constants of the at least one electrode, the liquid-crystal material, and at least a portion of the first transparent substrate and the second substrate.

17. The system of claim 16, further comprising a control system electrically coupled to the first electrode and the second electrode, the control system configured to provide the voltage to control the orientation of the liquid-crystal material and to provide the electrical current through the at least one electrode to heat the liquid-crystal material.

18. A method of controlling a liquid-crystal cell comprising a first transparent electrode, a second transparent electrode, and liquid-crystal material disposed between the first electrode and the second electrode, the method comprising:

controlling orientation of the liquid-crystal material by controlling a voltage between the first electrode and the second electrode; and resistively heating the liquid-crystal material by controlling an electrical current through at least one electrode of the first and second electrodes, characterized in that the electrical current is selected based on thermal time constants of the at least one electrode, the liquid-crystal material, and at least a portion of the first transparent substrate and the second substrate.

19. The method of claim 18, wherein controlling the electrical current through the at least one electrode comprises supplying a pulsed electrical current.

20. The method of claim 18, further comprising:

sensing temperature of the liquid-crystal material; and controlling the resistive heating in response to the sensed temperature.

* * * * *